(12) United States Patent
Beauvais et al.

(10) Patent No.: US 10,017,190 B2
(45) Date of Patent: Jul. 10, 2018

(54) OVERHEAD RAIL SYSTEM HAVING CHARIOTS MOVING LONGITUDINALLY ALONG THE RAIL SYSTEM

(71) Applicant: MINRAIL INC., Val-d'Or (CA)

(72) Inventors: Marc R. Beauvais, Val-d'Or (CA); Joanic Cossette, Val-d'Or (CA)

(73) Assignee: MINRAIL INC., Val-d'Or (CA)

( * ) Notice: Subject to any disclaimer, the term of this patent is extended or adjusted under 35 U.S.C. 154(b) by 248 days.

(21) Appl. No.: 14/890,710

(22) PCT Filed: Apr. 4, 2014

(86) PCT No.: PCT/CA2014/000326
§ 371 (c)(1),
(2) Date: Nov. 12, 2015

(87) PCT Pub. No.: WO2014/183191
PCT Pub. Date: Nov. 20, 2014

(65) Prior Publication Data
US 2016/0101788 A1    Apr. 14, 2016

Related U.S. Application Data

(60) Provisional application No. 61/823,021, filed on May 14, 2013, provisional application No. 61/823,025, filed on May 14, 2013.

(51) Int. Cl.
*B61B 3/02* (2006.01)
*E02B 7/20* (2006.01)
(Continued)

(52) U.S. Cl.
CPC ............... *B61B 3/02* (2013.01); *B61B 13/02* (2013.01); *E02B 7/20* (2013.01); *E02B 9/02* (2013.01);
(Continued)

(58) Field of Classification Search
CPC .... B61B 3/00; B61B 3/02; B61B 5/00; B61B 5/02; B61B 10/00; B61B 10/02;
(Continued)

(56) References Cited

U.S. PATENT DOCUMENTS

| 1,759,456 A | 5/1930 | Bjarne Hofseth |
| 3,636,883 A | 1/1972 | Wesener |

(Continued)

FOREIGN PATENT DOCUMENTS

| CA | 1296320 C | 2/1992 |
| FR | 2913653 A1 | 9/2008 |

(Continued)

*Primary Examiner* — Robert J McCarry, Jr.
(74) *Attorney, Agent, or Firm* — BCF LLP (57) ABSTRACT

The present disclosure relates to an overhead rail system having a pair of parallel rails, mountable to an overhead structure, and a rack line fixedly mounted underneath each rail. A pair of chariots is mounted on the pair of parallel rails. Each chariot has upper and lower bearings rollably connecting the chariot to a respective one of the pair of parallel rails. The bearings allow longitudinal movement of the chariot along a length of the parallel rails while limiting movement of the chariot in other directions. Each chariot has a pinion configured to engage respective rack lines. A drive system is operatively connected to the pinion of at least one of the chariots.

14 Claims, 9 Drawing Sheets

(51) Int. Cl.
*E02B 9/02* (2006.01)
*E21F 13/02* (2006.01)
*E21C 41/16* (2006.01)
*E21D 9/02* (2006.01)
*B61B 13/02* (2006.01)

(52) U.S. Cl.
CPC ............... *E21C 41/16* (2013.01); *E21D 9/02* (2013.01); *E21F 13/02* (2013.01)

(58) Field of Classification Search
CPC ....... B61B 10/022; B61B 13/00; B61B 13/02; B61B 13/04
See application file for complete search history.

(56) References Cited

U.S. PATENT DOCUMENTS

| | | | |
|---|---|---|---|
| 4,065,006 A | | 12/1977 | Barry |
| 4,123,109 A | | 10/1978 | Hill |
| 4,207,821 A | * | 6/1980 | Beckert ................... B60L 13/00 104/106 |
| 5,582,467 A | | 12/1996 | Drolet et al. |

FOREIGN PATENT DOCUMENTS

| | | |
|---|---|---|
| GB | 19574 | 4/1911 |
| GB | 863030 | 3/1961 |
| WO | 2010137108 A1 | 12/2010 |
| ZA | 9708622 B | 8/1998 |

\* cited by examiner

OVERHEAD RAIL SYSTEM HAVING CHARIOTS MOVING LONGITUDINALLY ALONG THE RAIL SYSTEM

CROSS-REFERENCE TO RELATED APPLICATION

Cross-reference is made to a commonly owned, co-pending patent application by Marc R. Beauvais for "MINING SITE HAVING A SHALLOW ANGLE EXTRACTION SHAFT, SHALLOW ANGLE MINING METHOD AND METHOD FOR CONSTRUCTING A PENSTOCK" filed on the same date as the present application. The cross-referenced application is incorporated herein by reference.

TECHNICAL FIELD

The present disclosure relates to the field of underground transport equipment. More specifically, the present disclosure relates to an overhead rail system having chariots mounted so that movement of the chariots is limited in directions other than longitudinally along the rails.

BACKGROUND

Underground mining, also called hard rock mining, relies on the excavation (i.e. digging) of substantially vertical and substantially horizontal galleries or tunnels, commonly called "shafts". Elevators and lifts are used in vertical shafts while wagons are used in horizontal shafts for transport of ore material, equipment, and personnel.

A commercially exploitable ore body oftentimes follows geological formations that may be at shallow angles, for example at 45 degrees from horizontal. Access to these formations using only horizontal and/or vertical shafts is not efficient. There are currently no available techniques and equipment capable of operating in mine shafts dug at shallow angles.

Shallow angle underground tunnels are also dug for other applications, including for instance for a penstock dug between a dam and a turbine and generator for hydro-electric applications. There is currently no efficient solution for transport of equipment or personnel along such tunnels.

Therefore, there is a need for transportation systems capable of transporting a load within tunnel dug at a shallow angle.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems of transporting a load within tunnel dug at a shallow angle.

The following terminology is used throughout the present disclosure:

Horizontal, perpendicular, parallel, straight: these terms are not to be construed in the absolute sense, but generally in the context of the present disclosure, which is related to transportation systems operated in rugged environments.

Overhead: from above.

Chariot: a rollable implement mountable on a rail, a trolley.

Rollably connected: joined in a manner that allows one element to roll on a surface of another element.

Rack line: a toothed bar for engaging a pinion of a rack-and-pinion drive.

Pinion: a toothed wheel for engaging a rack of a rack-and-pinion drive.

Drive system: a device or group of devices for providing motion to, or for stopping motion of, a movable device.

Rail section: a portion of a rail system comprising inter alia a length of rails, a rail section being mountable in series with other rail sections.

Rail beam: an elongated structure, part of a rail section, having a rolling surface.

Rack line section: a part of a rack line comprised in a rail section.

Figure 1:
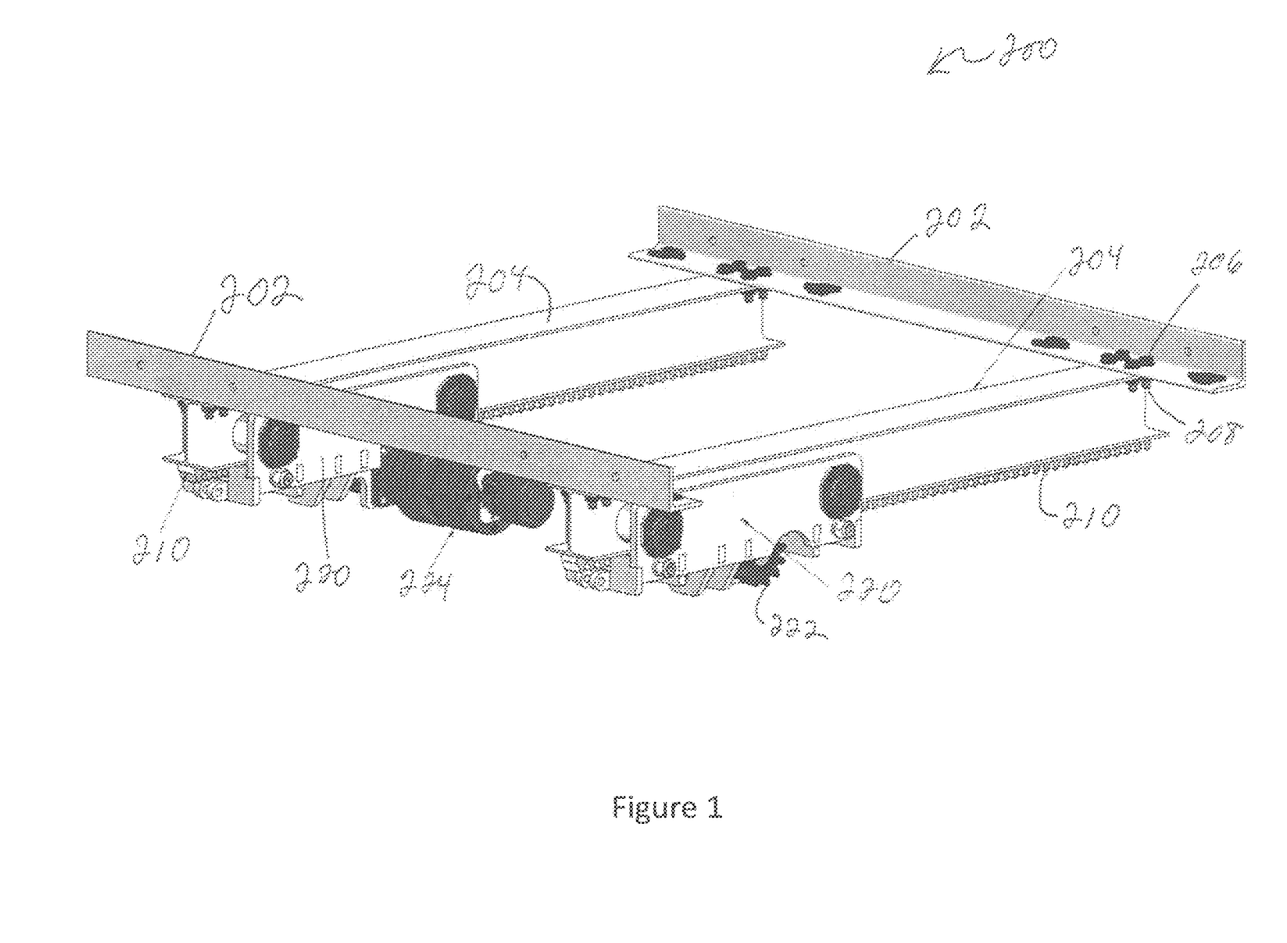
FIG. 1 is a perspective view of a section of an overhead rail system according to an embodiment.
Figure 2:
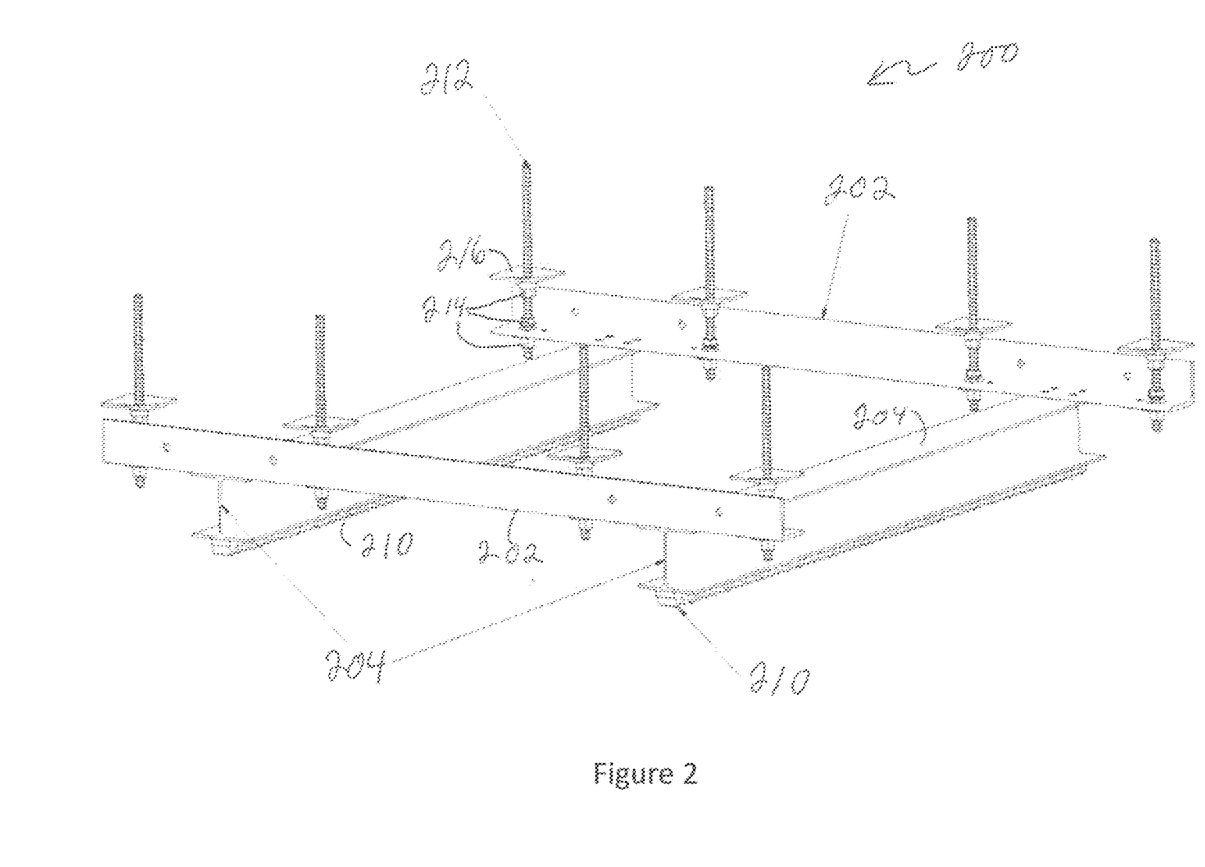
FIG. 2 is a perspective view showing attachments of the overhead rail system of FIG. 1 to the ceiling of the extraction shaft.

Underground operations within a shaft or tunnel dug at a shallow angle, for example for purposes of exploiting a mining site, are facilitated by installing an overhead rail system on an upper surface, i.e. a ceiling, of the tunnel or shaft. FIG. 1 is a perspective view of a section of an overhead rail system according to an embodiment. FIG. 2 is a perspective view showing attachments of the overhead rail system of FIG. 1 to the ceiling of a tunnel or shaft. Referring at once to FIGS. 1 and 2, an overhead rail system comprises a plurality of rail sections 200, a single rail section 200 being shown on FIGS. 1 and 2. Each rail section 200 comprises a pair of substantially parallel, transversal support beams 202, a pair of parallel rail beams 204 attached in substantially perpendicular manner to the transversal support beams 202 by use of bolts 206 and nuts 208, and a pair of rack line sections 210 fixedly mounted, for example by welding, underneath the rail beams 204. The rail section 200 is configured for attachment to a solid overhead structure, such as rock material in which a tunnel is dug, using a plurality of anchor bolts 212. Each anchor bolt 212 is mounted to one of the transversal support beams 202 using nuts 214, additional nuts 214 ensuring that washers 216 are maintained flush on a surface of the rock material 122. Mounting a plurality of rail sections 200 in series forms a continuous overhead rail system having continuous parallel rails and continuous rack lines.

A pair of chariots 220, or trolleys, is supported by the overhead rail system. Each chariot 220 comprises a drive sprocket, also called pinion 222, having teeth matching teeth of the rack line sections 210. The chariots 220 are driven by a drive system 224 connected to the pinions 222 of the chariots 220, the drive system 224 comprising for example a brake, a clutch and a motor, which may comprise an electric motor, a pneumatic motor, or a hydraulic motor receiving power from power systems present in a station located at an extremity of the tunnel. The drive system 224 may comprise two (2) motors respectively driving each of the chariots 220.

A variant of the overhead rail system is contemplated, in which the drive system 224 drives a single one of the chariots 220. In this variant, another, non-driven chariot does not necessarily have a pinion and can be mounted on a rail beam that not does necessarily have a rack line section. When a rack line section 210 is only present on one parallel rail beam 204 per rail section 200, the rail sections 200 are assembled in series taking care to align the rack line sections 210 to form a continuous rack line.

Figure 3:
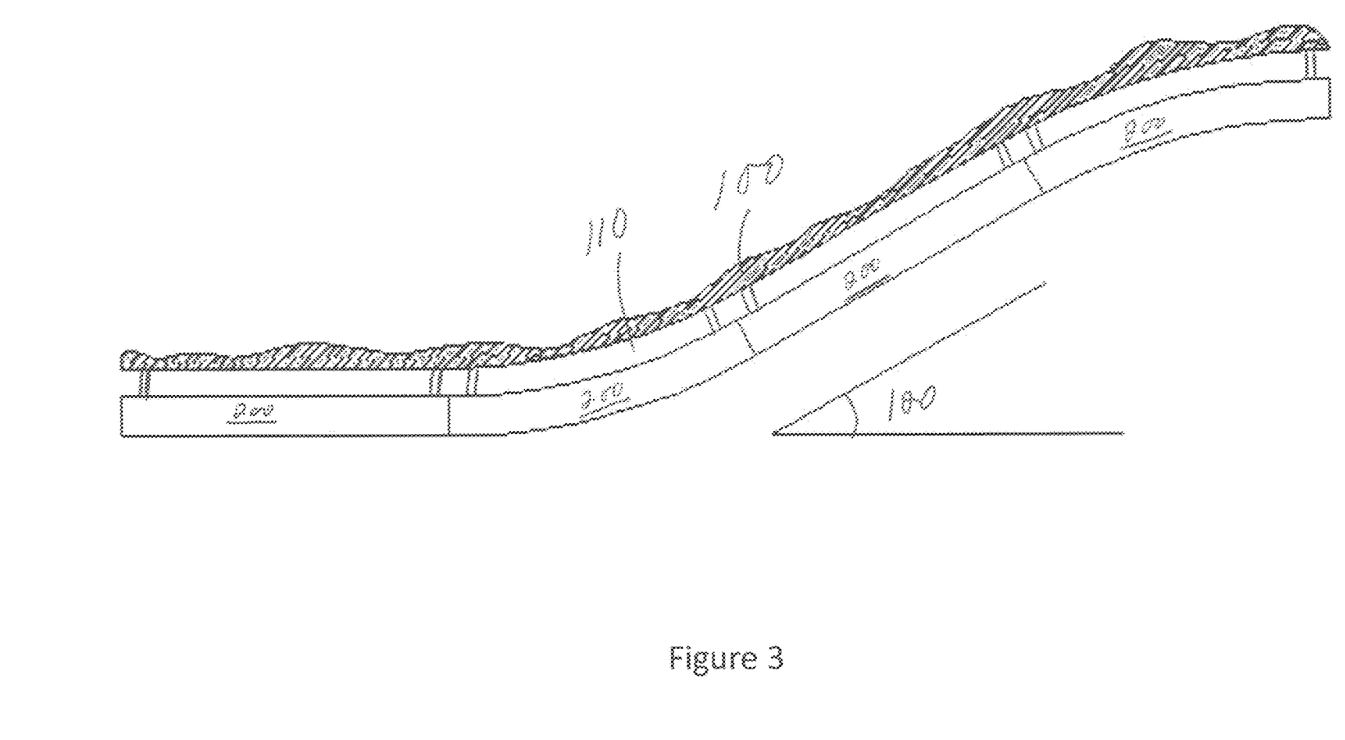
FIG. 3 is side elevation of an example path of the overhead rail system.

A plurality of rail sections 200 are mounted along a length of the tunnel, forming a continuous overhead rail system along such tunnel. FIG. 3 is side elevation of an example path of the overhead rail system. A plurality of rail sections 200 attached to rock material 100 follow a path of a tunnel 110 dug into the rock material 100. Though the rail beams 204 as illustrated on FIGS. 1 and 2 are straight, they can be given a moderate curve in order to follow a path of the tunnel 110, diverging to the left or to the right, or following a variation of an incline 120 of the tunnel 110 relative to the horizon. There is no limitation to the angle of the incline 120. The chariots 220 are capable to seamlessly move between rail sections 200, at angles gradually varying from horizontal to vertical.

A mobile implement (not shown), for example a platform or a cart, carrying mining equipment (not shown) such as for example a scraper winch, explosive charges, and drills, is supported to the overhead rail system by the chariots 200. Like the motor of the brake, clutch and motor assembly 224, the equipment carried by the mobile implement is powered by electric, pneumatic or hydraulic power systems present in a station located at an extremity of the tunnel 110. For example in case where the tunnel 110 is an extraction shaft dug through an exploitable ore body, equipment carried by the mobile implement can be used to extract ore material from the ore body. Of course, the mobile implement can also be used for carrying workers along the tunnel 110. Other types of load can be supported by the overhead rail system and the present mention of a platform is not intended to limit the present disclosure.

Figure 4:
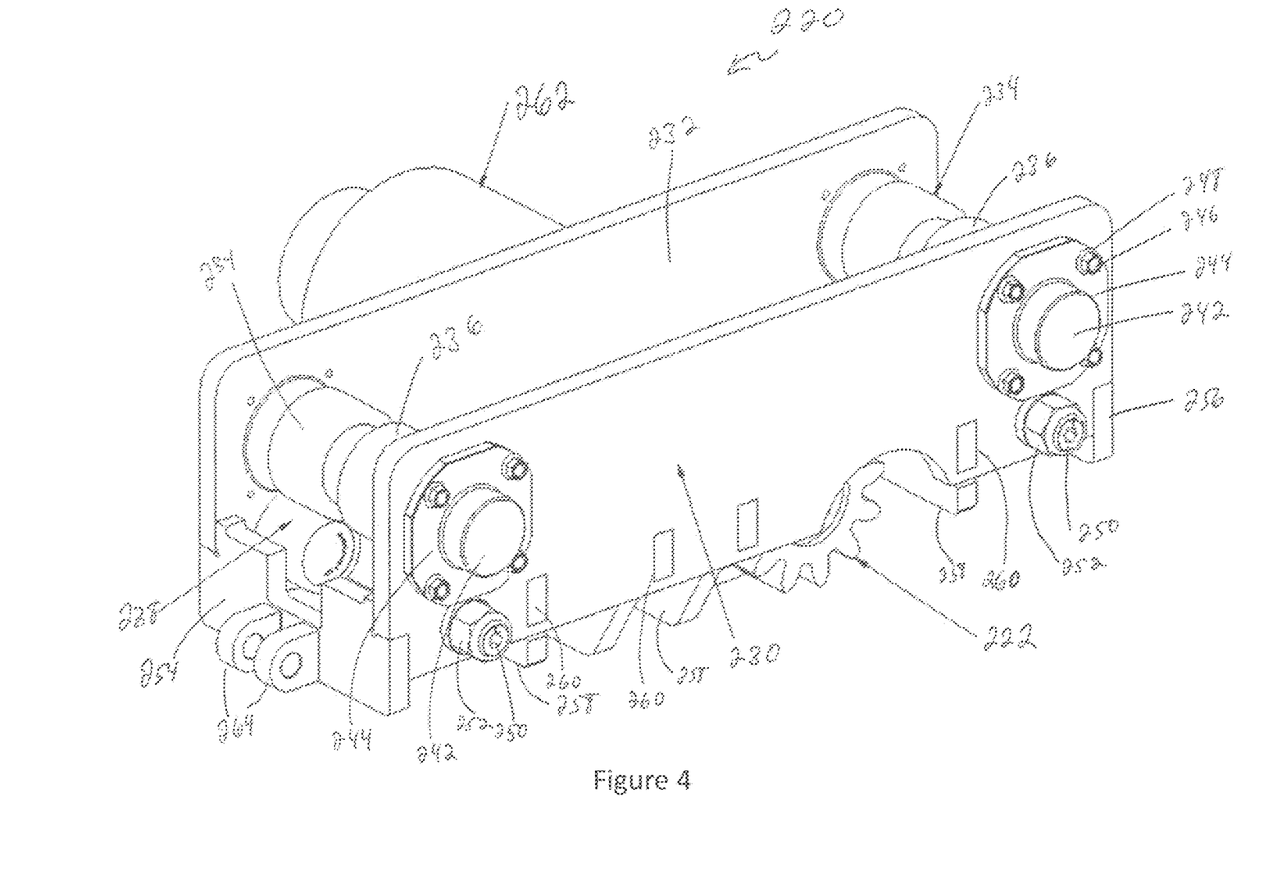
FIG. 4 is a detailed, top perspective view of a chariot of FIG. 1.
Figure 5:
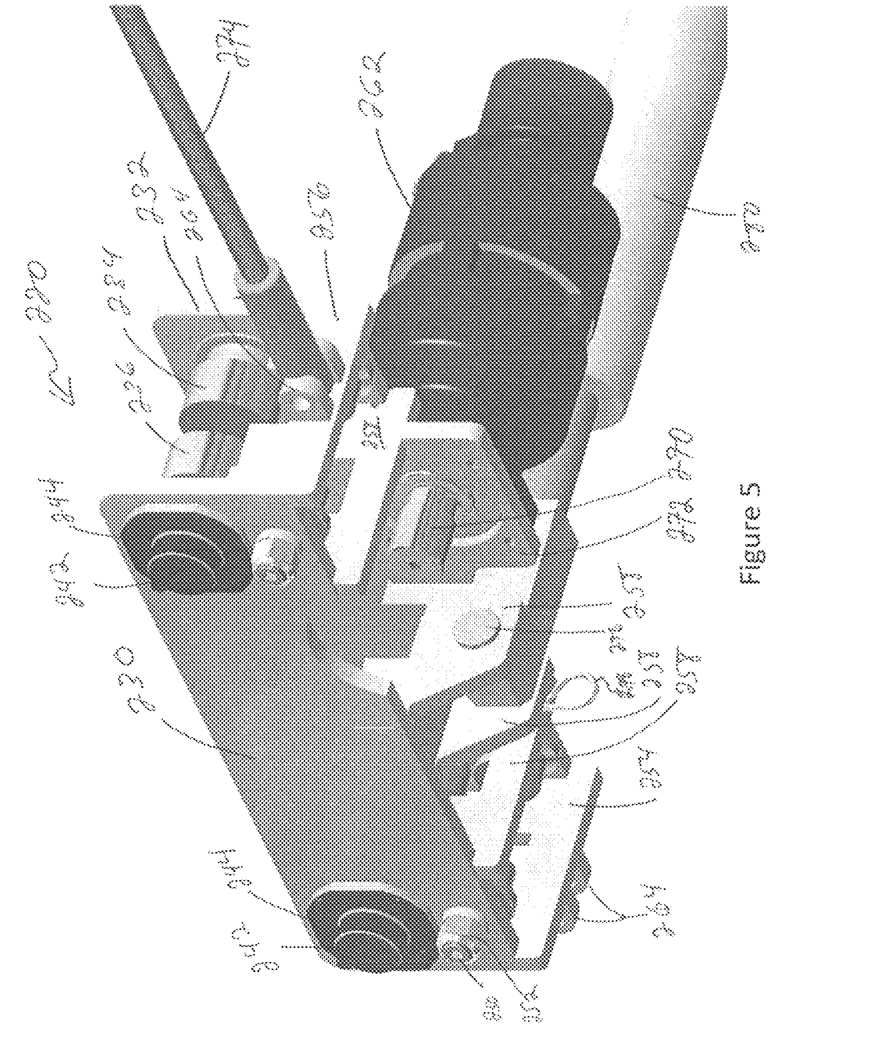
FIG. 5 is a detailed, bottom perspective view of the chariot of FIG. 1.
Figure 6:
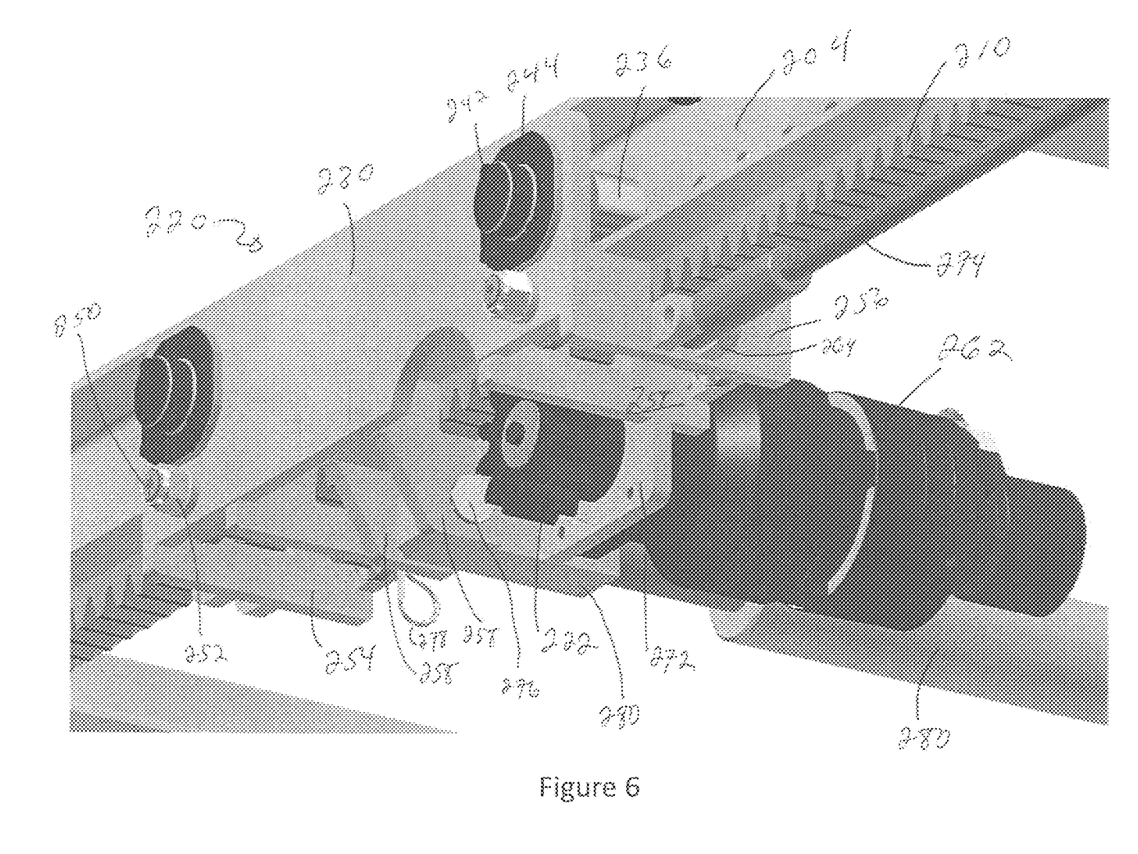
FIG. 6 is a detailed, bottom perspective view of the chariot of FIG. 1 mounted on a rail of the overhead rail system of FIG. 1.

FIG. 4 is a detailed, top perspective view of a chariot of FIG. 1. FIG. 5 is a detailed, bottom perspective view of the chariot of FIG. 1. FIG. 6 is a detailed, bottom perspective view of the chariot of FIG. 1 mounted on a rail of the overhead rail system of FIG. 1. Referring at once to FIGS. 4, 5 and 6, the chariot 220 comprises an external plate 230 and an internal plate 232 supporting, at each end of the chariot 220, internal upper bearings 234, external upper bearings 236, internal lower bearings 238 (only one is shown) and external lower bearings 240 (one is shown on a later Figure). The internal and external upper bearings 236, 238 have extensions 242 protruding through the external and internal plates 230, 232 (only shown on the external plate 230) mounted to the external and internal plates 230, 232 via caps 244, bolts 246 and nuts 248. The internal and external lower bearings 238, 240 are mounted to the external and internal plates 230, 232 via bots 250 and nuts (only shown on the external plate 230). The external and internal plates 230, 232 are held together in part by a front plate 254 and a rear plate 256 that may for example be welded to the external and internal plates 230, 232. The external and internal plates 230, 232 are further held together by reinforcement plates 258 welded to the external and internal plates at points 260. Other manners of assembling the external, internal, front, rear and reinforcement plates are contemplated.

A motor 262, which is part of the drive system 224, is held on the chariot 220 by a plate 272 welded to the internal plate 232 and to one of the reinforcement plates 258. The plate 272 has an aperture for a shaft 270 of the motor 262. The shaft 270 is connected to the pinion 222 so that the motor 262 can propel the chariot 220 on the rail beam 204. The motor 262 has a reversible drive to propel the chariot 220 in forward and reverse directions, as desired. A pair of attachment points 264 is mounted on the front plate 254. Another pair of attachment points 264 is mounted on the rear plate 256. Two or more chariots 220 on a same rail beam 204 can be connected in series by connecting the chariots 220 using links 274 attached to the attachment points 264 of successive chariots 220.

Two (2) central reinforcement plates 258 comprise apertures (not explicitly shown) for insertion of a sturdy pin 276 holding a transversal beam 280 supporting the mobile implement and that can further link two chariots 220 mounted on the two parallel rail beams 204. A cutter pin 278 maintains the pin 276 in place. In a variant, the mobile implement can be attached to other points of the chariot 220, as required by an application, insofar as the mobile implemented is attached in a manner that does not impede movement of the chariot 220 on a respective rail beam 204.

Figure 7:
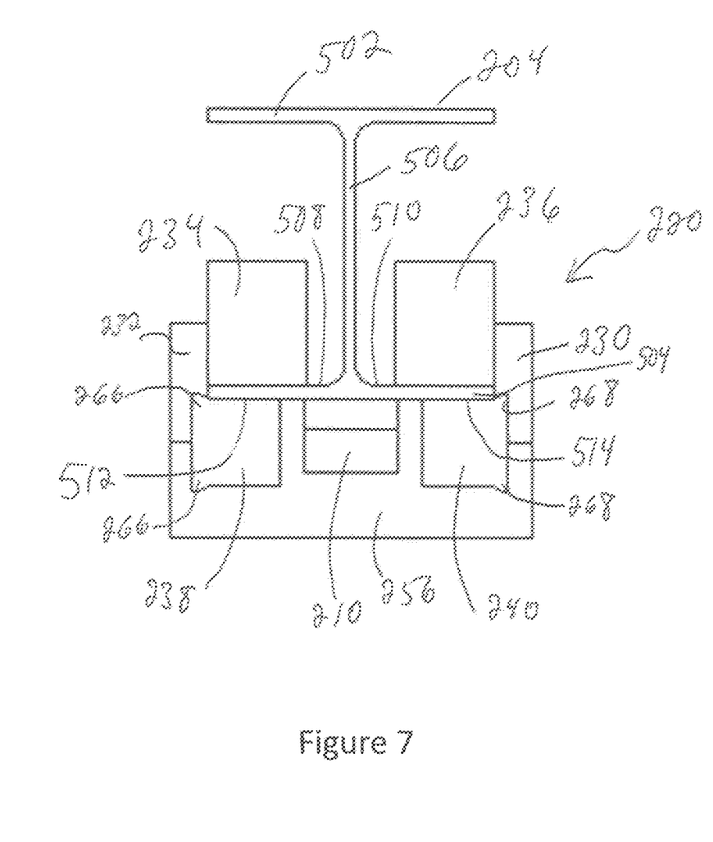
FIG. 7 schematically represents a relationship of the upper and lower bearings of the chariot of FIG. 4 on a rail beam of FIG. 1.

FIG. 7 schematically represents a relationship of the upper and lower bearings of the chariot of FIG. 4 on a rail beam of FIG. 1. FIG. 7 is not to scale. Comparing FIGS. 4 and 5, the chariot 220 is seen from its front side, with the front plate 254 removed in order to fully show the internal and external lower bearings 238, 240. The chariot 220 is mounted on one of the rail beams 204. The rail beam 204 is an "I" beam having upper and lower flanges 502, 504, separated by a web 506. The lower flange 504 has two upper rolling surfaces 508, 510 separated by the web 506, and two lower rolling surfaces 512, 514, separated by the rack line section 210. A pair of internal upper bearings 234 (only one is shown) roll on the upper rolling surface 508. A pair of external upper bearings 236 (only one is shown) roll on the upper rolling surface 510. A pair of internal lower bearings 238 (only one is shown) roll on the lower rolling surface 512. A pair of external lower bearings 240 (only one is shown) roll on the lower rolling surface 514, for example an upside-down "T" beam or a compound beam, are contemplated.

Sizes of the bearings and the manner in which they are mounted on the chariot 220 are configured so that little or no gap is present between each bearing pair, made of an upper bearing and a mating lower bearing, and the lower flange 504. This substantially prevents any up and down movement of the bearings relative to the lower flange 504. As a result, relative vertical movement between the chariot 220 and the rail beam 204 is limited.

In a particular aspect, diameters of the internal and external lower bearings 238, 240 widen at their opposite ends, forming ribs 266 and 268. By wrapping around the edges of the lower flange 504, the ribs 266, 268 substantially maintain a lateral relationship between the internal and external lower bearings 238, 240 and the lower flange 504. As a result, relative lateral movement between the chariot 220 and the rail beam 204 is also limited. Consequently, the chariot 220 can easily move along a length of the rail beam 204, and continue its motion from one rail section 200 to the next, but is generally prevented from moving in any other axis. A variant, in which ribs are formed on the internal and external upper bearings 234, 236, wrapping around the edges of the lower flange 504 for the same purpose, is also contemplated.

Figure 8:
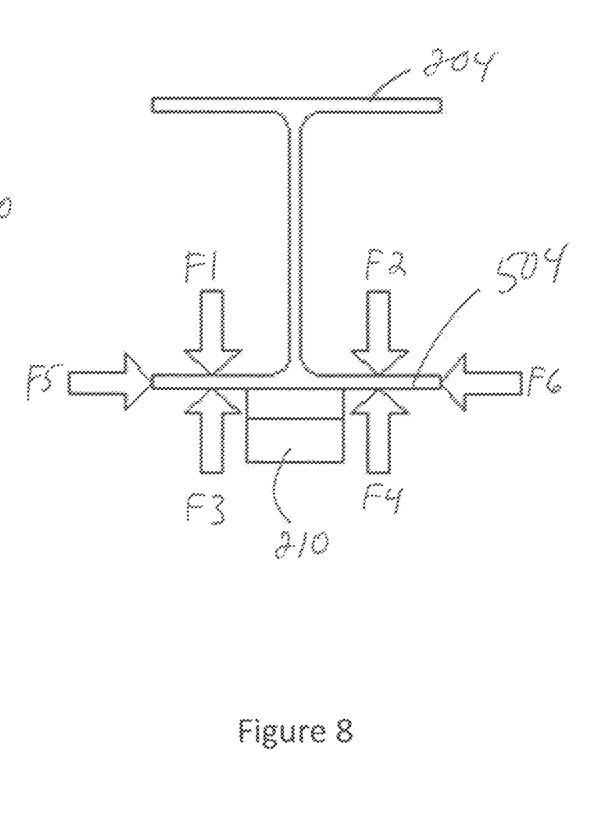
FIG. 8 schematically represents forces applied on a rail beam of FIG. 1 by upper and lower bearings of the chariot of FIG. 4.

FIG. 8 schematically represents forces applied on a rail beam of FIG. 1 by upper and lower bearings of the chariot of FIG. 4. Forces are transmitted between the bearings of the chariot 220 and the lower flange 504 of the rail beam 204. In particular, the internal upper bearings 234 transmit a force F1 at each end of the chariot 220 while the external upper bearings 236 transmit a force F2, also at each end of the chariot 220, on the lower flange 504. These forces are prevalent when a load is attached to the chariot 220, directly underneath the chariot 220, via the attachment points 264. In case any loading condition tends to lift the chariot 220, the internal lower bearings 238 and the external lower bearings 240 can respectively transmit forces F3 and F4, also at each end of the chariot 220, on the lower flange 504. For example, application of a strong torque from the motor 262 on the pinion 222 may tend to cause a rotation of the chariot 220 about an axis of the pinion 222. In such case, the forces F3 and F4 may be high at one end of the chariot 220 while being substantially lower at the other end where forces F1 and F2 may be strong. Any force tending to move the chariot 220 sideways is compensated by one of the forces F5 or F6 transmitted to the edges of the lower flange 504 from the rib 266 of the internal lower bearing 238 or from rib 268 of the external lower bearing 240.

Figure 9:
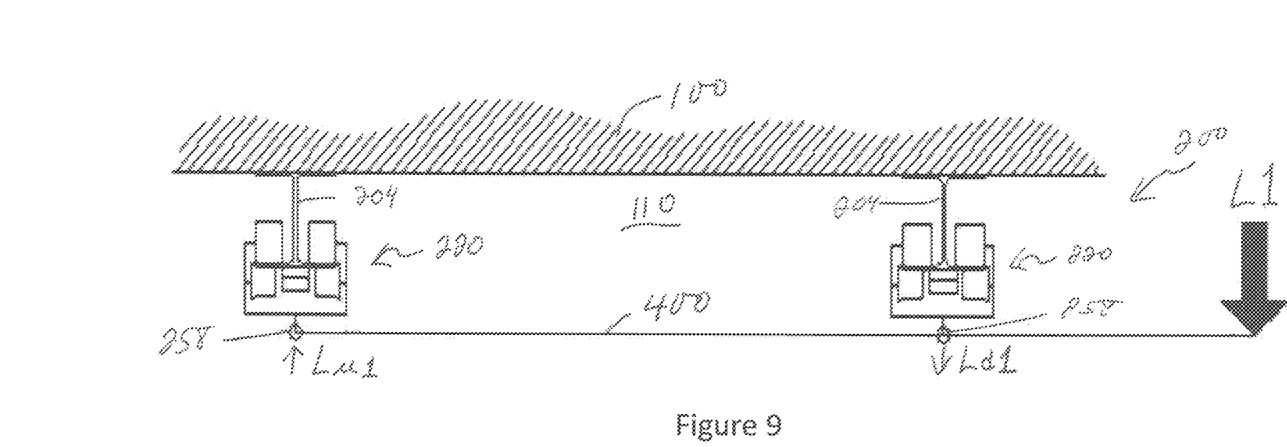
FIG. 9 is a schematic representation of a load applied eccentrically relative to a rolling axis of the overhead rail system of FIG. 1.

FIG. 9 is a schematic representation of a load eccentrically applied relative to a rolling axis of the overhead rail system of FIG. 1. A mobile implement 400 is mounted to the attachment points 264 of two chariots 220. A load having a center of gravity designated by arrow L1 is carried by the mobile implement 400. The mobile implement 400 transmits a downward load Ld1 to a nearest chariot 220 (on the right of the overhead rail system 200 as seen on FIG. 9) and an upward load Lu1 to a farthest chariot 220 (on the left of the overhead rail system 200 as seen on FIG. 9). Forces F1 and F2 are prevalent in the nearest (right) chariot 220, transmitting the load Ld1 to the lower flange 504 of the rail beam 204 on the right hand side of FIG. 9. Forces F3 and F4 are prevalent on the other (left) chariot 220 and transmit the load Lu1 to the lower flange 504 of the rail beam 204 on the left hand side of FIG. 9. The configuration of the bearings of the chariots 220 on the lower flanges 504 of the rail beams 204 ensures that the chariots 220 remain in position on the rail beams 204 and that the supported mobile implement 400 remains parallel to the overhead rail system 200 and to the ceiling of the tunnel 110 formed by the rock material 100 (assuming no bending of the mobile implement 400). Of course, the chariots 220, the mobile implement 400 and its load can move along a path of the overhead rail system 200, following the rail beams 204.

Figure 10:
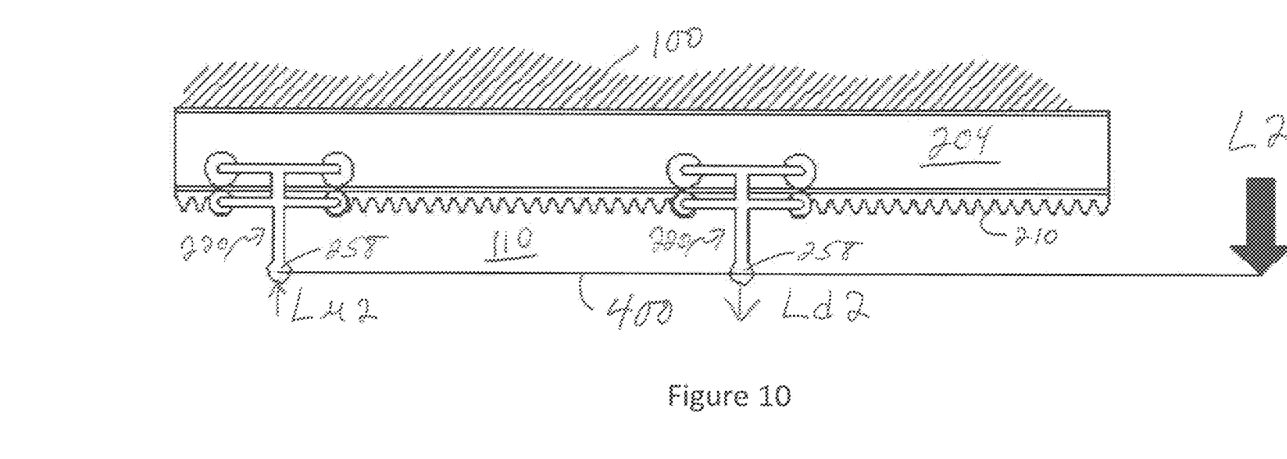
FIG. 10 is a schematic representation of an overhanging load applied to the overhead rail system of FIG. 1.

FIG. 10 is a schematic representation of an overhanging load applied to the overhead rail system of FIG. 1. The variant of FIG. 10 shows two (2) chariots 220 mounted on a same rail beam 204, another pair of chariots 220 (not shown) being mounted on the other rail beam 204 (also not shown). One or more drive systems, such as the drive system 224 of FIG. 1, are operably connected to one or more of the four (4) chariots of this variant. The mobile implement 400 is mounted to the attachment points 264 of the four (4) chariots 220. A load having a center of gravity designated by arrow L2 is carried by the mobile implement 400. This center of gravity is at an overhanging placement relative to a perimeter formed by the four (4) chariots 220. The mobile implement 400 transmits a downward load Ld2 to the nearest chariots 220 and an upward load Lu2 to farthest chariots 220. Forces F1 and F2 are prevalent in the nearest chariots 220 while forces F3 and F4 are prevalent on the farthest chariots 220. As in the case of FIG. 9, the configuration of the bearings of the chariots 220 ensures that the chariots 220 remain in position on the rail beams 204 and that the supported mobile implement 400 remains parallel to the overhead rail system 200 and to the ceiling of the tunnel 110 formed by the rock material 100. Also in the case of FIG. 10, the chariots 220, the mobile implement 400 and its load can move along a path of the overhead rail system 200, following the rail beams 204.

Figure 11:
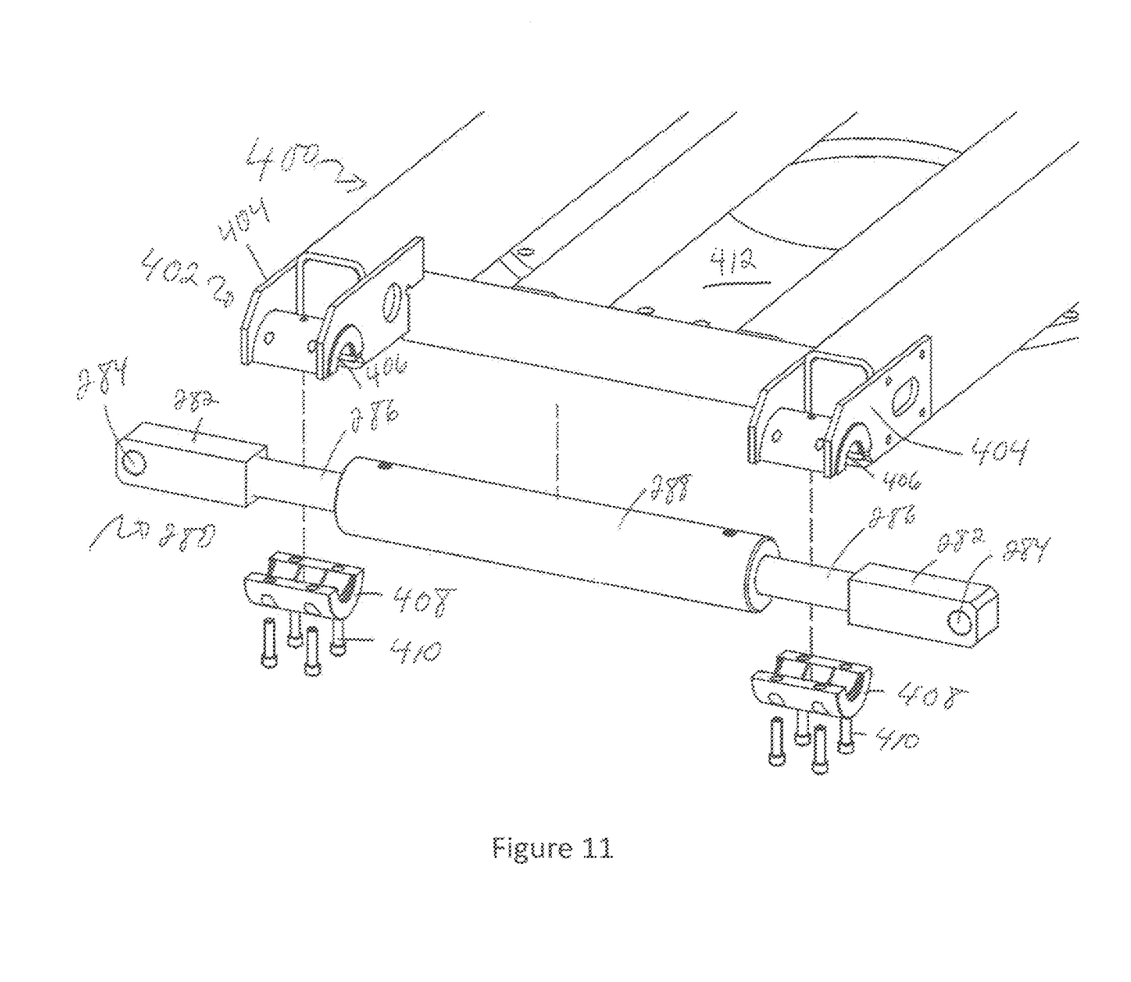
FIG. 11 is a perspective view of the transversal beam of FIGS. 5 and 6 and a partial perspective view of an example of mobile implement.

FIG. 11 is a perspective view of the transversal beam of FIGS. 5 and 6 and a partial perspective view of an example of mobile implement. The transversal beam 280 comprises two (2) end-sections 282 having generally square cross-sections having apertures 284. The end-sections 282 are configured for installation between reinforcement plates 258 of each of two (2) opposite chariots 220. The apertures 284 allow insertion of the pins 276 through the reinforcement plates 258 and through the end-sections 282. A central part of the transversal beam 280 forms a cylinder 288 having a first cross-section. Rods 286 having a second cross-section smaller than the first cross-section are located between the cylinder 288 and each of the end-sections 282. One end 402 of the mobile implement 400 comprises two extensions 404 having semi-circular openings 406 adapted for mating with the rods 286 of the transversal beam 280. Half cylinders 408 complement the semi-circular openings 406 of the extensions 404 and also mate with the rods 286. Bolts 410 maintain the half cylinders 408 attached to the extensions 404. Grease or similar lubricant may be used to allow some rotation of the mobile implement 400 in relation to the transversal beam 280. Equipment, ore container, and the like can be attached to a platform 412 of the mobile implement in conventional manner. FIG. 11 is one of several manners that can be contemplated for mounting a useful payload to the chariots 220 and does not limit the present disclosure.

The present overhead rail system has been introduced by reference to underground operations. However, other uses of the overhead rail system are also contemplated. The overhead rail system can be installed and operated in other sites, such as industrial sites, built on or above the ground, either fully or in part.

Those of ordinary skill in the art will realize that the description of the overhead rail system are illustrative only and are not intended to be in any way limiting. Other embodiments will readily suggest themselves to such persons with ordinary skill in the art having the benefit of the present disclosure. Furthermore, the disclosed overhead rail system may be customized to offer valuable solutions to existing needs and problems related to transporting a load within tunnel dug at a shallow angle.

In the interest of clarity, not all of the routine features of the implementations of overhead rail system are shown and described. It will, of course, be appreciated that in the development of any such actual implementation of the overhead rail system, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of underground transport equipment having the benefit of the present disclosure.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An overhead rail system, comprising:
a pair of parallel rails mountable to an overhead structure, a rack line being fixedly mounted underneath at least one the parallel rails;
a pair of chariots, each chariot comprising upper and lower bearings rollably connecting the chariot to a respective one of the pair of parallel rails and allowing longitudinal movement of the chariot along a length of the parallel rails while limiting movement of the chariot in other directions, at least one of the chariots having a pinion configured to engage the rack line; and
a drive system operatively connected to the pinion of the at least one of the chariots.

2. The overhead rail system of claim 1, comprising a plurality of rail sections, each rail section comprising a pair of parallel rail beams, a rack line section being fixedly mounted underneath at least one of the parallel rail beams, the plurality of rail sections being mountable in series to the overhead structure, aligning the rack line sections, to form the pair of parallel rails.

3. The overhead rail system of claim 1, comprising:
two rack lines, one rack line being fixedly mounted underneath each of the parallel rails; and
two pinions, one pinion being mounted in each of the chariots, each pinion being configured to engage a respective rack line.

4. The overhead rail system of claim 3, wherein the drive system is operatively connected to the two pinions.

5. The overhead rail system of claim 3, comprising a plurality of rail sections, each rail section comprising a pair of parallel rail beams, a rack line section being fixedly mounted underneath each rail beam, the plurality of rail sections being mountable in series to the overhead structure to form the pair of parallel rails.

6. The overhead rail system of claim 5, wherein each rail section comprises a pair of transversal support beams substantially perpendicular to the pair of parallel rail beams, the rail section being mountable to the overhead structure by attachment of the pair of transversal support beams to the overhead structure.

7. The overhead rail system of claim 5, wherein at least one rail section is straight.

8. The overhead rail system of claim 5, wherein at least one rail section is curved to the left or to the right.

9. The overhead rail system of claim 5, wherein at least one rail section is curved to follow an incline of the overhead structure.

10. The overhead rail system of claim 1, wherein:
each one of the pair of parallel rails comprises a pair of upper rolling surfaces and a pair of lower rolling surfaces; and
each chariot comprises two pairs of upper bearings rolling on the pair of upper rolling surfaces of the respective one of the pair of parallel rails and two pairs of lower bearings rolling on the pair of lower rolling surface of the respective one of the pair of parallel rails.

11. The overhead rail system of claim 10, wherein each of the two pairs of upper bearings comprises a pair of upper bearings at each opposite end of the chariot and wherein each of the two pairs of lower bearings comprises a pair of lower bearings at each opposite end of the chariot.

12. The overhead rail system of claim 10, wherein each of the lower bearings comprises a rib for preventing a lateral movement of the chariots in relation to the respective one of the pair of parallel rails.

13. The overhead rail system of claim 1, comprising two pairs of chariots, one pair of chariots being mounted on each one of the pair of parallel rails.

14. The overhead rail system of claim 1, wherein each chariot comprises an attachment point for mounting of a load.

* * * * *